Figure 1:
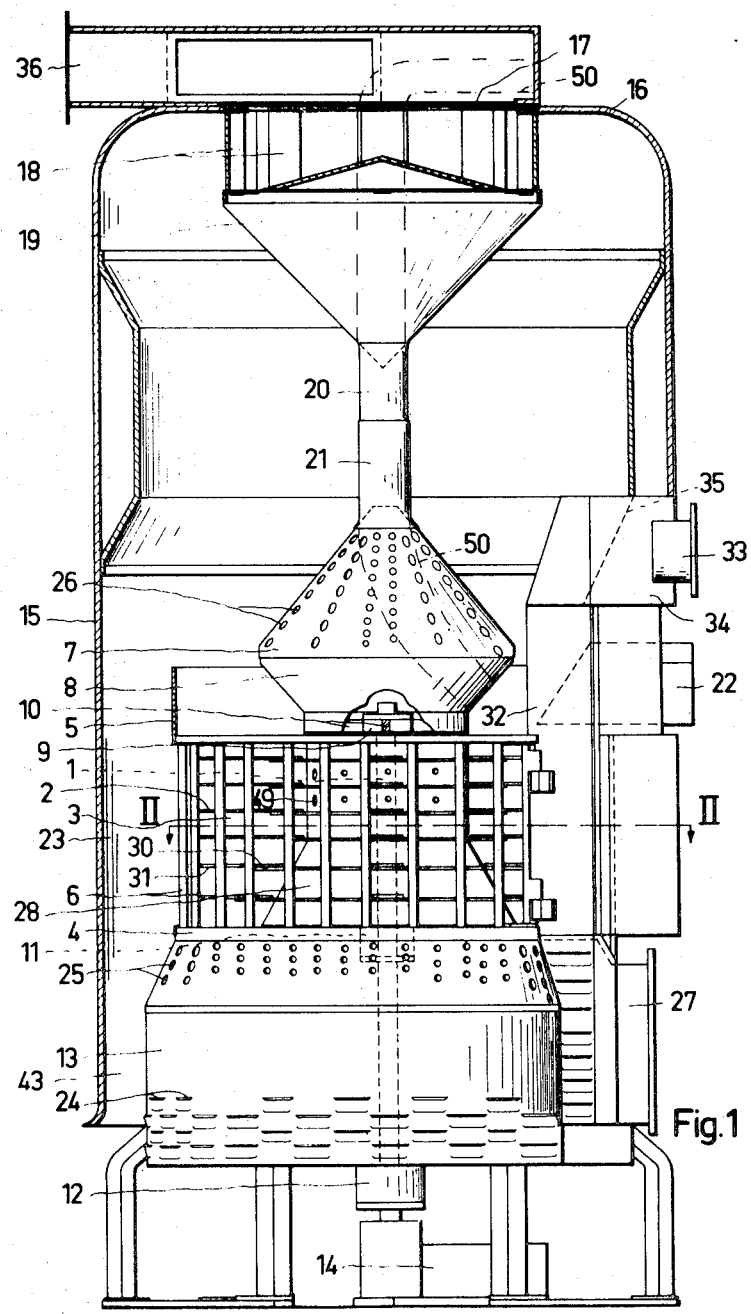

United States Patent

[11] 3,550,599

| | | |
|---|---|---|
| [72] | Inventor | Arne Johansson<br>Vallingby, Sweden |
| [21] | Appl. No. | 739,531 |
| [22] | Filed | June 24, 1968 |
| [45] | Patented | Dec. 29, 1970 |
| [73] | Assignee | Arenco Aktiebolag<br>Stokholm-Vallingby, Sweden |
| [32] | Priority | June 30, 1967 |
| [33] | | Sweden |
| [31] | | No. 10184/1967 |

[54] APPARATUS FOR THRESHING TOBACCO LEAVES AND SEPARATING THE THRESHED TOBACCO
4 Claims, 4 Drawing Figs.

[52] U.S. Cl...................................................... 131/146,
209/138
[51] Int. Cl......................................................A24b 05/06
[50] Field of Search........................................... 131/146;
209/28, 138

[56] References Cited
UNITED STATES PATENTS

| | | | |
|---|---|---|---|
| 3,229,698 | 1/1966 | Johansson et al............. | 131/146 |
| 3,386,451 | 6/1968 | Pietrucci et al............... | 131/146 |
| 3,401,701 | 9/1968 | Pietrucci..................... | 131/146 |

FOREIGN PATENTS

| | | | |
|---|---|---|---|
| 6,500,390 | 7/1965 | Netherlands................. | 131/146 |

*Primary Examiner*—Samuel Koren
*Assistant Examiner*—James H. Czerwonky
*Attorney*—Sughrue, Rothwell, Mion, Zinn & Macpeak ABSTRACT: A machine for threshing tobacco leaves and separating the tobacco threshed, comprising a threshing chamber having a vertical, tubular wall and at least one rotating threshing wheel mounted on a vertical shaft in the threshing chamber. In the wall of the threshing chamber an outlet grid opening extending around at least the major part of the periphery of the threshing chamber and above the threshing chamber, a cap presenting an upwardly tapering wall. A separating chamber, in which air flows upwardly, extending between on one side the outlet opening and the cap and on the other side an outer casing. Means are provided for supplying air to the threshing chamber and the separating chamber. The air supply means includes means for directing air upwardly and centrally through the full vertical extent of the threshing chamber, the wall of the cap being provided with openings and the interior of the cap receiving air from the central portion of the threshing chamber. The cap provides the separating chamber with additional air through the openings.

APPARATUS FOR THRESHING TOBACCO LEAVES AND SEPARATING THE THRESHED TOBACCO

The present invention is concerned with a machine for threshing tobacco leaves and separating the threshed tobacco, the machine comprising an arrangement for supplying tobacco leaves to a threshing chamber, in which at least one threshing wheel mounted for rotation on a vertically journaled shaft is arranged and which chamber is connected, via an outlet opening provided with a grid, directly to a separating chamber in which air flows upwardly and which comprises an annular space situated between the outlet grid opening of the threshing chamber, a casing situated below said opening, and a cap situated above the threshing chamber and presenting an upwardly extending essentially conically tapering wall, which is preferably arranged with an annular opening between the wall and the circumference of the threshing chamber, and an outer wall enclosing said parts.

A known machine of this type has been thoroughly described in the Swedish Pat. specification 197,838 and is distinguished, among other things, by its high capacity and separating ability. One desire when threshing tobacco leaves is that the threshed and separated tobacco shall contain as high a percentage of large leave portions as possible. In the known machine it sometimes happens that a large leaf portion during its upward passage, in which it follows a more or less helical path in the separating chamber suddenly turns back and falls downwardly, either back into the threshing chamber if the machine is design for threshing and separating in several stages, or into the chamber below the threshing chamber where the leaf portion with the falling stalk portions can be carried out of the machine. In the first instance an undesired disintegration of the leaf portion takes place, while in the second instance the leaf portion is lost completely.

The object of the present invention is to avoid this disadvantage. This object has been realized in a simple manner by providing the wall of the cap with perforations, and by providing means for blowing air into the separating chamber through the perforations disposed in the cap. The aforementioned disadvantage would appear to be caused by the fact that during the operation of the machine quickly changing regions of a lower pressure than that which prevails in the separating chamber in general generally form at the surface of the conical cap. Such regions may also be formed at the outlet opening of the threshing chamber. It is possible that for short periods of time these regions are so situated that relatively long passages are formed in the longitudinal direction of the separating chamber along the surface of the cap, which passages may even extend down in front of the outlet opening of the threshing chamber, and into which opening the tobacco leaves may be sucked, to then fall downwards in the separating chamber. By injecting air into the separating chamber of the machine according to the invention, through the perforations in the wall of the cap such regions of low pressure are prevented from occurring. According to a preferred embodiment the threshing wheel is provided with a tubular hub through which air is passed to the interior of the cap. It may be expedient in this connection to inject air into the threshing chamber also through perforations in the tubular hub, so that regions of low pressure are prevented from building outside the outlet opening. This injection of air contributes, at the same time, to the fact that the tobacco leaf is thrown out of the threshing chamber as quickly as possible, without blockages. Furthermore, in this case, the tendency of the tobacco portions to follow a helical path, caused by the threshing wheel, in the separating chamber is amplified, which in certain cases is an advantage, and can be amplified still further if desired by adapting the cap so that it can be rotated together with the threshing wheel.

Figure 2:
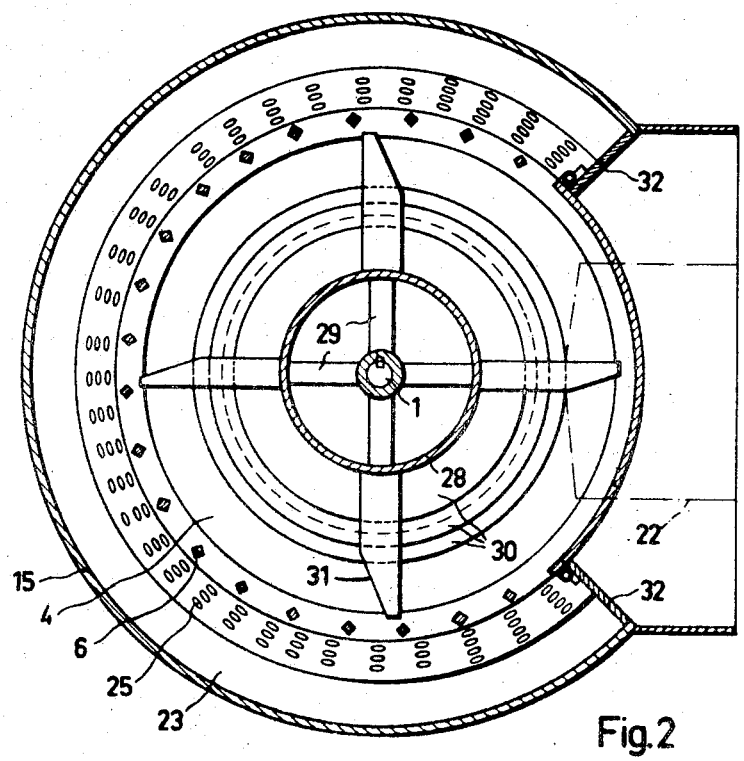
Figure 3:
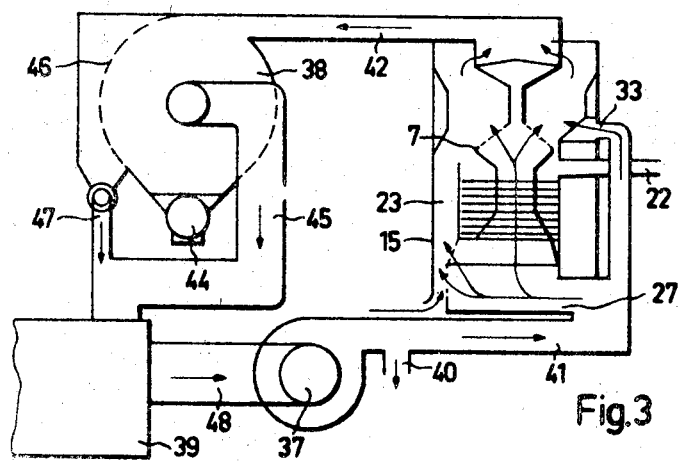
Figure 4:
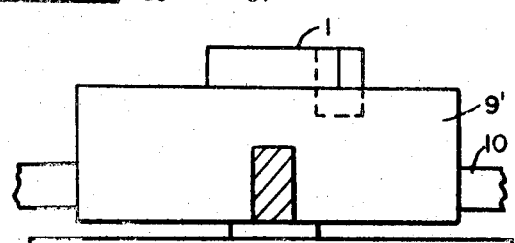

The invention is illustrated in the accompanying drawing, in which FIG. 1 is a diagrammatical vertical projection, partly in section, of an embodiment of the invention. FIG. 2 shows a horizontal section along the line II–II in FIG. 1, and FIG. 3 shows a diagram of the air circulation through the machine shown in FIGS. 1 and 2, provided with the necessary auxiliary devices. FIG. 4 discloses an alternative arrangement of the cap and bearing to permit the cap to rotate.

The machine shown in the drawing has a threshing wheel 2 mounted on a vertical shaft 1. The threshing wheel is situated in a threshing chamber 3 having a bottom 4, an upper tubular, stationary wall portion 5 and a portion which is situated between the part 5 and the circumference of the bottom 4 and which comprises vertically extending rods 6 which form a grid for an outlet opening of the threshing chamber 3. Inserted in the upper, open end 5 of the chamber 3 is an upwardly tapered cap 7 which is so dimensioned that an annular space is formed between the lower end 8 of the cap 7, the end 8 tapering downwardly, and the wall 5 of the chamber 3. The shaft 1, on which the threshing wheel 2 is mounted, is journaled for rotation in an upper bearing 9 which, by means of spokes 10, is securely attached within the lower portion 8 of the cap 7, an intermediate bearing 11, which is securely attached to the bottom 4 and a lower bearing 12, which is securely attached to the bottom of a casing 13 securely arranged below the threshing chamber 3, and the shaft 1 is driven by a gear reduction motor 14 arranged below the casing 13.

The machine is also provided with an outer casing comprising an essentially cylindrical wall 15 which extends from the bottom casing 13 and upwards beyond the cap 7 spaced from the bottom casing 13 and the wall of the threshing chamber 3. The upper portion of the wall 15 has an inwardly directed flange which forms the roof 16 of the outer casing, and in which an opening 17 of relatively large diameter is disposed. Situated beneath the roof 16 are brackets 18 in which a closed body in the form of a double cone 19 is securely suspended some distance below the roof 16. The lower end of the double cone is provided with a downwardly directed branch pipe 20 which is inserted in and securely attached to an upwardly directed branch pipe 21, located on the upper end of the cap 7.

The tobacco is fed into the threshing chamber 3 via a pipe 22 which passes through the walls 15 and 5, and the threshed tobacco is thrown out between the rods 6 to a separating chamber 23 comprised of the space between the wall 15 and the casing 13, the rods 6, the wall 5, the cap 7, the branch pipes 21, 20 and the double cone 19, and in which chamber air is blown upwardly by means of obliquely, upwardly directed openings 24, 25 disposed in the top and bottom portions of the casing 13 and openings 26 in the wall of the cap 7. Air is introduced into the casing 13 through a pipe 27 which passes through the wall 15 and the wall of the casing 13, and air is passed to the cap 7 via an opening in the roof of the casing 13 and in the bottom 4, said opening communicating with the bottom, open end of the cap 7 via an annular hub 28 of the threshing wheel 2. The hub 28 is securely connected with the shaft 1 by means of spokes 29 and rings 30 are attached to its outer surface; radially outwardly extending knife-blades or threshing teeth 31 being mounted on said rings. To prevent the flow of air up through the chamber 23 from being disturbed by the supply pipe 22 the chamber 23 is restricted by two radially directed vertical walls 32 on either side of the supply pipe 22, and for the same reason air is injected above said tube 22 by means of a conduit 33 passing through the wall 15, the said conduit opening out into a chamber 34 having a perforated wall 35 situated in the chamber 23.

The tobacco is threshed and the threshed tobacco separated principally in the same manner as that described in the Swedish Pat. specification 197,838. By injecting air into the separating chamber 23 through the openings 26 in the cap 7, however, regions of low pressure are prevented from forming in the chamber adjacent the wall of the cap, in which regions whereas if such regions were allowed to occur, pure tobacco leaves located therein would be liable to fall down into the threshing chamber 3.

All air which flows up through the various parts of the separating chamber 23 departs together with the threshed tobacco through the opening 17 and a discharge conduit 36 connected to the opening.

FIG. 3 shows how the machine is connected to a fan 37, a cyclone 38 and a filter 39 with suitably selected distribution of air flow through the various parts of the complete arrangement being indicated in $m^3/h$ in the drawing. The fan provides an air flow of 1,7000 $m^3/h$, of which 6,000 $m^3/h$ is released out through a conduit 40 and 11,000 $m^3/h$ is passed to the machine through a conduit 41, which is connected to the pipe 27 on the cap 13 and through the tube 33 leading to the chamber 34; 8,000 $m^3/h$ being passed to the pipe 27 and 3,000 $m^3/h$ being passed to the pipe 33. A total of 5,000 $m^3/h$ is blown through the openings 24 and 25 and 3,000 $m^3/h$ through the openings 26 in the cap 7. The discharge pipe 36 is connected to the suction side of the fan 37 over the cyclone 38 and the filter 39 via the conduit 42, through which 17,000 $m^3/h$ of air is drawn. Since only 11,000 $m^3/h$ is passed to the machine through the conduit 41 the quantity of air which is drawn into the lower-most portion 43 of the separating chamber between the wall 15 and the casing 13 is equal to 6,000 $m^3/h$, through which portion 43 the separated stem portions fall out, as described in the aforementioned patent specification. The cyclone 38 is provided with a discharge sluice 44 for pure leaf portions and is connected in a conventional manner to the filter 39 via a conduit 45 through which 12,000 $m^3/h$ of air flows. The cyclone is also provided with a curved, perforated wall 46 through which 5,000 $m^3/h$ of air passes per hour together with heavier particles, such as fine dust, gravel etc. which may often be entrained with the tobacco leaves and which is thus prevented from following the leaves portions discharged through the sluice 44. This air flow is passed through a conduit 47 to the filter 39, which is connected to the suction side of the fan 37 by a conduit 48.

The shown embodiment may obviously be modified in many ways within the scope of the invention. It is often expedient to inject air into the chamber 23 through the threshing chamber 3 in order to prevent regions of low pressure from forming in front of the rods 6, which injection may occur since the hub 28 is provided with openings 49, (FIG. 1) in a manner corresponding to that of the cap 7.

The separating chamber may also be adapted to extend around the total circumference of the threshing chamber 3, whereby the tobacco is suitably fed into the threshing chamber through a conduit 50, shown in FIG. 1 by dot-dash lines, through the cap 7.

The threshing chamber 3 may also be divided up into several threshing chambers, as shown in said Pat. No. 197,838, or may be provided with varying threshing action along the longitudinal axis.

The helical movement executed by the flow of air in the separating chamber may be amplified partly by the arrangement of the openings 49 in the hub 28 and partly by allowing the cap 7 to rotate together with the threshing wheel 2, this latter alternative affording a particular advantage if the tobacco is fed down into the threshing chamber by means of the conduit 50, since the tobacco may then be more easily distributed downwardly in the threshing chamber before the threshing process starts.

To enable cap 7 to rotate together with threshing wheel 2 the hub 9' illustrated in FIG. 4 is used in lieu of upper bearing 9 shown in FIG. 1 and is attached to the spokes 10 and supporting cap 7. The hub 9' is fixedly splined to shaft 1 by means of a spline 9''. as seen in FIG. 4, so that the cap rotates together with shaft 1. The pipe 20, which is inserted in pipe 21, can be arranged to allow pipe 21 to rotate in relation to pipe 20.

I claim:

1. A machine for threshing tobacco and separating the tobacco threshed, comprising a threshing chamber having tubular wall portions, means for supplying the tobacco leaves to said threshing chamber, at least one rotating threshing wheel in said threshing chamber, a vertical shaft to which said threshing wheel is attached, bearings for a vertical journaling of said shaft, a motor driving said shaft, a separating chamber communicating with an outlet opening in the wall portions of said threshing chamber, a grid for said outlet opening, means for supplying air to said threshing and separating chamber, means for directing a vertical air stream upwardly in said separating chamber carrying the lighter tobacco leaf portions in said separating chamber, and an outer substantially tubular wall enclosing said threshing chamber, said separating chamber including an annular spacing between on the one hand said outlet grid opening, a casing situated below said opening, and a cap situated above the threshing chamber and presenting an upwardly essentially conically tapering wall and on the other hand said outer substantially tubular wall, said separating chamber extending around at least the major part of the periphery of said threshing chamber, said means for supplying air including means for directing air upwardly and centrally through the full vertical extent of said threshing chamber, and said tapering wall of said cap provided with openings and communicating with said last mentioned air directing means, said openings directing air into said separating chamber.

2. A machine according to claim 1, wherein said means for directing air upwardly and centrally through the threshing chamber comprises a tubular hub of the threshing wheel.

3. A machine according to claim 2 wherein said hub is provided with openings for directing air into said separating chamber through the threshing chamber.

4. A machine according to claim 1, wherein said cap is fixedly mounted for rotation together with said threshing wheel.